July 18, 1950          H. MOE          2,515,787
GAUGE FOR LINEAR MATERIALS
Filed March 26, 1945          2 Sheets-Sheet 1
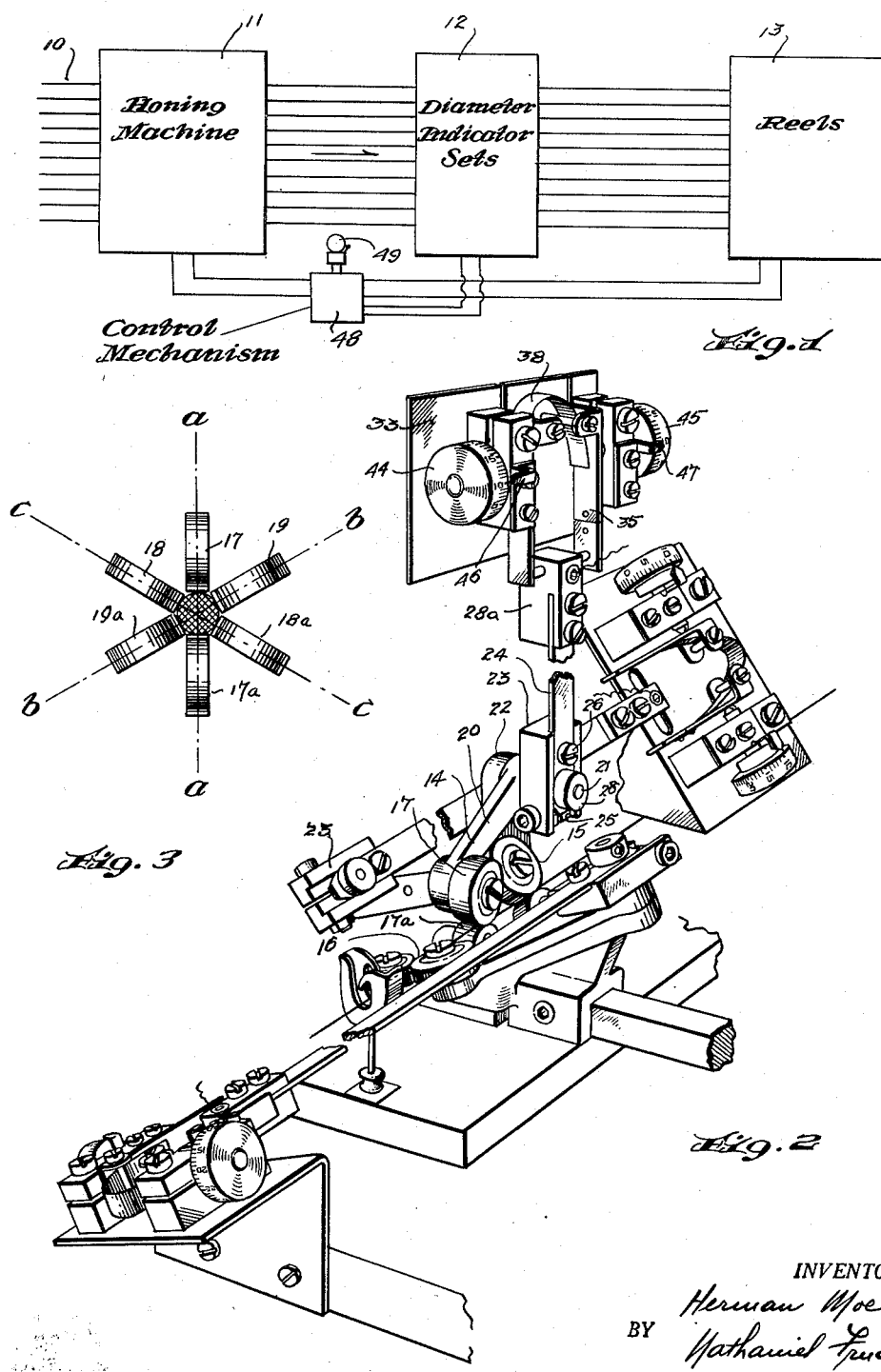
INVENTOR.
Herman Moe
BY Nathaniel Frucht
Attorney

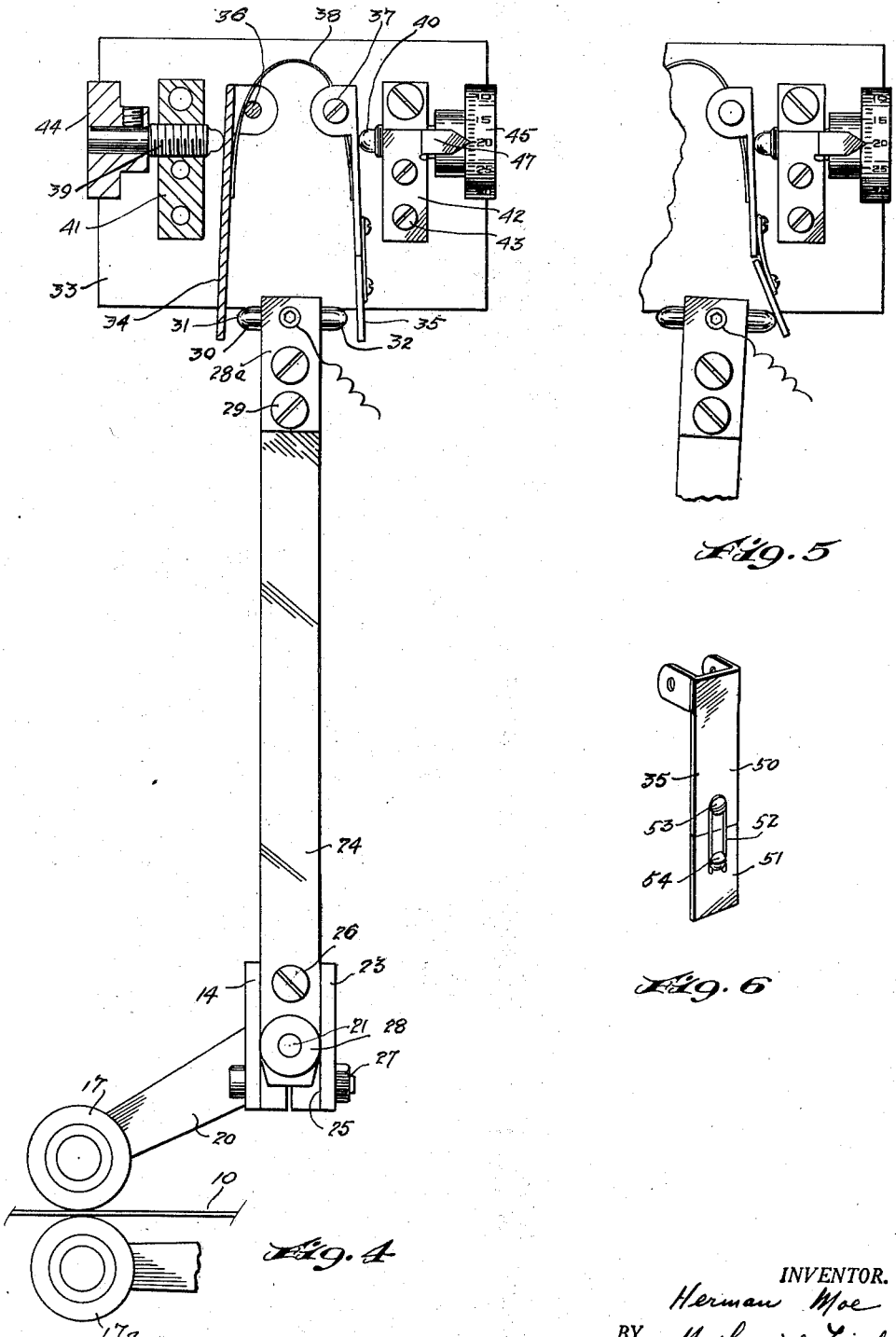

Patented July 18, 1950

2,515,787

UNITED STATES PATENT OFFICE 2,515,787

GAUGE FOR LINEAR MATERIALS

Herman Moe, Warwick, R. I., assignor to Ashaway Line & Twine Mfg. Co., a corporation of Rhode Island Application March 26, 1945, Serial No. 584,795

2 Claims. (Cl. 33—149)

The present invention relates to the manufacture of fishing lines and other material in wire or ribbon form which are continuously processed, as by honing or polishing, to obtain uniform diameter or thickness.

The principal object of the invention is to provide a novel gage for accurately checking the material diameter or thickness.

Another object of the invention is to provide mechanism whereby the processing of the material is automatically stopped whenever the diameter or thickness varies beyond a predetermined maximum or minimum.

Still another object is to provide a diameter or thickness gage which may be quickly and accurately set for a desired tolerance.

A further object of the invention is to provide a diameter and thickness gage in which the tolerance adjustment is not affected or disturbed when an unusually large obstruction, such as a knot, enters the gage.

With the above and other objects and advantageous features in view, the invention consists of a novel arrangement of parts more fully disclosed in the detailed description following, in conjunction with the accompanying drawings, and more specifically defined in the claims appended thereto.

Referring to the drawings,

Fig. 1 is a schematic view showing the positioning of the novel gages in the line of processing travel;

Fig. 2 is a perspective view, partly broken away, showing the preferred arrangement of gage parts for checking the processing of a fishing line;

Fig. 3 is a diagrammatic layout of the preferred angular spacing of the gage parts;

Fig. 4 is an elevation of the gage parts for checking one diameter of the fishing line;

Fig. 5 is a detail view showing the position of the gage parts when an unusual thickness, such as a knot, occurs; and Fig. 6 is a perspective detail of the movable contact element of the electric contact mechanism of Fig. 5.

It has been found desirable to provide a simple and effective gage for gaging the diameter or thickness of fishing lines, wires, ribbons, and other linear material during the processing thereof, which can be set for any desired tolerance, and which is not sprung, warped or otherwise rendered inaccurate if an unusual material thickness occurs. When applied to the processing of fishing line the gage may be positioned subsequent to the honing and polishing step and before the reeling, to accurately gage the processed work and to stop the processing and otherwise signal the operator whenever the tolerance is exceeded, so that the operator can mark or otherwise identify such off-size portions of the fishing line.

Referring to the drawings, which illustrate the preferred gage arrangement for checking the diameter of processed fishing line, the fishing lines 10, see Fig. 1, pass through a honing and polishing machine 11 and then through the control gage devices 12 to the reels 13.

It is preferred to check the line diameter at three angles, as indicated by the lines $a$—$a$, $b$—$b$ and $c$—$c$ in Fig. 3. The line is therefore passed through three diameter gages 14, 15 and 16, each comprising a pair of spaced rollers 17, 17$a$, 18, 18$a$, and 19, 19$a$, the gages being linearly spaced along the line as illustrated in Fig. 2. The rollers 17, 18 and 19 are preferably movable, and the rollers 17$a$, 18$a$ and 19$a$ are mounted on fixed arms, whereby any thinness or thickness of the line as it passes between the rollers of each set causes a movement of the movable roller and as hereinafter described stops the apparatus and signals the operator so that he may mark or otherwise indicate the off-size line portion.

The arrangement of the parts for the three gages is preferably the same, and the operation of the parts is therefore described with reference to the gage 14. The movable roller 17 is rotatably mounted on the lower end of an arm 20, which is secured at its upper end to a shaft 21 in a fixed bearing 22, see Fig. 2, which is secured to the frame. A block 23 is also mounted on the shaft 21 for receiving the lower end of a multiplying rod 24, being provided with a milled recess 25, see Fig. 2, for this purpose, and the rod 24 is locked in the recess by means of a set screw 26; the lower end of the block is split and has a lock bolt 27 to frictionally grip the shaft 21. Referring now to Fig. 4, a clamp nut 28 is threaded on the end of the shaft 21 and is tightened to lock the block 23 and therefore the rod 24 in desired angular relation to the arm 20.

An insulating block 28$a$ is secured to the upper end of the rod 24 by screws 29, the insulating block having a contact pin 30 extending laterally from the sides thereof to provide two contact ends 31, 32. A support bracket 33 is mounted in the frame adjacent the upper end of the rod 24 and has two pivot plates 34, 35 pivoted on the support bracket on pins 36, 37, a leaf spring 38 being positioned as illustrated to normally press the two pivot plates outwardly with their ends in spaced relation to the contact pin ends 31, 32.

The spacing between the pin ends 31, 32 and the pivot plates 34, 35 is controlled by micrometer adjusting screws 39, 40 which are threaded in seats 41, 42 secured to the support bracket 33 by screws or the like 43, the micrometer screws being turned by graduated hand wheels 44, 45 which have their indicia indicated by fixed pointers 46, 47 secured to the seats 41, 42. The threads are of the proper spacing to permit a close adjustment of the clearance between the plates 34, 35 and the contact pin ends 31, 32, it being preferred to set the plates evenly on both sides of the contact block so that the desired tolerance is divided. The frame and the plates 34, 35 are grounded, and the contact pin 30 is connected to a source of electric current, so that contact of the pin end 31 with plate 34, or pin end 32 with plate 35 energizes a control mechanism 48, see Fig. 1, which has standard relays and controls to stop the apparatus and, if desired, to also operate a signal 49, whereupon the operator marks or tags the line or ties a knot in it to signify that the permissible tolerance in diameter has been exceeded.

If an unusual lump or a knot occurs in the line, it might cause too great a movement of the rod 24 and might damage the gage. It is therefore preferred to make the plate 35 in two parts, see Figs. 5 and 6, the upper part 50 and the lower part 51 being resiliently held together by a spring 52, which is illustrated as a U shaped leaf spring held to the plate portions by screws 53, 54. When a knot or lump in the line causes an excessive movement of the movable roller and therefore a large movement of the upper end of the rod 24 the spring 52 yields as illustrated in Fig. 5 to prevent damage to the gage.

Although I have described a specific embodiment of the invention which is particularly suitable for checking the diameter of fishing lines, it is obvious that the novel gage may be utilized to check on the diameter of wires, and on the thickness of non-circular linear material such as ribbons, and that changes in the size, arrangement and operation of the parts may be made to suit different requirements for gaging linear material during processing, without departing from the spirit and the scope of the invention as defined in the appended claims.

I claim:

1. A diameter gage for linear material comprising a fixed roller and a movable roller adapted to receive the linear material therebetween, a shaft, an arm mounted on said shaft, said movable roller being mounted on said arm, a block angularly adjustable on said shaft and secured thereto, a rod having one end locked to said block, electrical contact means, and means on the other end of the rod for closing an electrical circuit through said contact means upon predetermined excessive movement of said movable roller.

2. A diameter gage for linear material comprising a fixed roller and a movable roller adapted to receive the linear material therebetween, a shaft, an arm mounted on said shaft, said movable roller being mounted on said arm, a block angularly adjustable on said shaft and secured thereto, a rod having one end locked to said block, electrical contact means, one of said contact means including a contact plate having a base section and a movable section resiliently secured to the base section, and means on the other end of the rod for closing an electrical circuit through said contact means upon predetermined excessive movement of said movable roller.

HERMAN MOE.

REFERENCES CITED

The following references are of record in the file of this patent:

UNITED STATES PATENTS

| Number | Name | Date |
| --- | --- | --- |
| 763,011 | Mietaschk | June 21, 1904 |
| 1,133,300 | McGauley | Mar. 30, 1915 |
| 1,274,698 | Edgecomb | Aug. 6, 1918 |
| 1,603,808 | Schane | Oct. 19, 1926 |
| 2,073,365 | Darlington | Mar. 9, 1937 |
| 2,179,517 | Pelosi | Nov. 14, 1939 |
| 2,293,923 | Stewart et al. | Aug. 25, 1942 |